United States Patent
Amrhein et al.

(10) Patent No.: US 9,335,938 B2
(45) Date of Patent: *May 10, 2016

(54) OPTIMIZED TRANSFER AND STORAGE OF HIGHLY DENORMALIZED DATA IN AN IN-MEMORY DATA GRID

(71) Applicant: International Business Machines Corporation, Armonk, NY (US)

(72) Inventors: Dustin K. Amrhein, Zachary, LA (US); Douglas C. Berg, Rochester, MN (US); Kulvir S. Bhogal, Fort Worth, TX (US); Nitin Gaur, Round Rock, TX (US); Christopher D. Johnson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 197 days.

This patent is subject to a terminal disclaimer.

(21) Appl. No.: 14/226,880

(22) Filed: Mar. 27, 2014

(65) Prior Publication Data

US 2015/0278302 A1 Oct. 1, 2015

(51) Int. Cl.
*G06F 17/30* (2006.01)
*G06F 3/06* (2006.01)

(52) U.S. Cl.
CPC .............. *G06F 3/0613* (2013.01); *G06F 3/064* (2013.01); *G06F 3/0674* (2013.01); *G06F 17/30091* (2013.01); *G06F 17/30292* (2013.01); *G06F 17/30442* (2013.01)

(58) Field of Classification Search
USPC .................................. 707/713, 802, 803, 812
IPC .................................. G06F 17/30091,17/30292
See application file for complete search history.

(56) References Cited

U.S. PATENT DOCUMENTS

| 7,404,186 B2* | 7/2008 | Massarenti | G06F 9/4435 709/231 |
| 7,461,077 B1* | 12/2008 | Greenwood | G06F 3/0482 |
| 8,001,142 B2* | 8/2011 | Gopinath | G06F 17/30575 707/770 |
| 2002/0194015 A1* | 12/2002 | Gordon | G06Q 10/10 705/1.1 |
| 2009/0259683 A1* | 10/2009 | Murty | G06F 17/30607 |
| 2011/0041006 A1* | 2/2011 | Fowler | G06F 9/466 714/10 |
| 2011/0173410 A1* | 7/2011 | Castillo | G06F 11/3442 711/170 |

(Continued)

OTHER PUBLICATIONS

Amrhein et al., "Optimized Transfer and Storage of Highly Denormalized Data in an In-Memory Data Grid," Filed on Oct. 29, 2014, p. 1-23, U.S. Appl. No. 14/526,809.

*Primary Examiner* — Cam-Linh Nguyen
(74) *Attorney, Agent, or Firm* — Patricia B. Feighan

(57) ABSTRACT

A method for transferring and storing a data set associated with an in-memory data grid (IMDG) is provided. The method may include identifying at least two data object instances associated with the data set based on a determined relationship between the at least two data object instances. The method may also include performing a field relation analysis on the identified at least two data object instances and recording the field relation analysis. The method may include receiving a request for a data object associated with the data set. The method may include determining if an optimization can be performed on the data object. The method may include omitting a field value associated with the data object based on the determined optimization. The method may include inflating the omitted field value into the data set associated with the data object request and returning the data set with the inflated field value.

6 Claims, 4 Drawing Sheets

(56) References Cited

U.S. PATENT DOCUMENTS

| | | |
|---|---|---|
| 2012/0158745 A1 | 6/2012 | Gorelik et al. |
| 2012/0246202 A1* | 9/2012 | Surtani ............. G06F 17/30607 707/812 |
| 2012/0278422 A1* | 11/2012 | Oliver .................. G06F 9/4843 709/212 |
| 2012/0303634 A1 | 11/2012 | Antani et al. |
| 2012/0311295 A1 | 12/2012 | Gaur et al. |
| 2013/0019000 A1 | 1/2013 | Markus et al. |

* cited by examiner

OPTIMIZED TRANSFER AND STORAGE OF HIGHLY DENORMALIZED DATA IN AN IN-MEMORY DATA GRID

FIELD OF THE INVENTION

The present invention relates generally to the field of computing, and more particularly to the transfer and storage of data.

BACKGROUND

A data grid is an architecture or set of services that gives individuals or groups of users the ability to access, modify and transfer extremely large amounts of geographically distributed data for research purposes. An in-memory data grid (IMDG) is a data structure that resides entirely in RAM (random access memory), and is distributed among multiple servers. In-memory data grid (IMDG) solutions typically provide security restrictions, such as key-based access as to who may access the data. While an IMDG solution may optimize data access, it can also be limiting as compared to the relational type access that relational databases offer.

SUMMARY

According to one embodiment, a method for transferring and storing a data set associated with an in-memory data grid (IMDG) is provided. The method may include identifying at least two data object instances associated with the data set based on a determined relationship between the at least two data object instances. The method may also include performing a field relation analysis on the identified at least two data object instances. The method may further include recording the field relation analysis. Additionally, the method may include receiving a request for a data object associated with the data set. The method may also include determining if an optimization can be performed on the data object. The method may include omitting a field value associated with the data object based on the determined optimization. The method may further include inflating the omitted field value into the data set associated with the data object request. The method may include returning the data set with the inflated field value.

According to another embodiment, a computer system for transferring and storing a data set associated with an in-memory data grid (IMDG) is provided. The computer system may include one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method. The method may include identifying at least two data object instances associated with the data set based on a determined relationship between the at least two data object instances. The method may also include performing a field relation analysis on the identified at least two data object instances. The method may further include recording the field relation analysis. Additionally, the method may include receiving a request for a data object associated with the data set. The method may also include determining if an optimization can be performed on the data object. The method may include omitting a field value associated with the data object based on the determined optimization. The method may further include inflating the omitted field value into the data set associated with the data object request. The method may include returning the data set with the inflated field value.

According to yet another embodiment, a computer program product for transferring and storing a data set associated with an in-memory data grid (IMDG) is provided. The computer program product may include one or more computer-readable tangible storage medium and program instructions stored on at least one of the one or more tangible storage medium, the program instructions executable by a processor. The computer program product may also include program instructions to identify at least two data object instances associated with the data set based on a determined relationship between the at least two data object instances. The computer program product may include program instructions to perform a field relation analysis on the identified at least two data object instances. The computer program product may further include program instructions to record the field relation analysis. Additionally, computer program product may include program instructions to receive a request for a data object associated with the data set. The computer program product may also include program instructions to determine if an optimization can be performed on the data object. The computer program product may also include program instructions to omit a field value associated with the data object based on the determined optimization. The computer program product may further include program instructions to inflate the omitted field value into the data set associated with the data object request. The computer program product may include program instructions to return the data set with the inflated field value.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
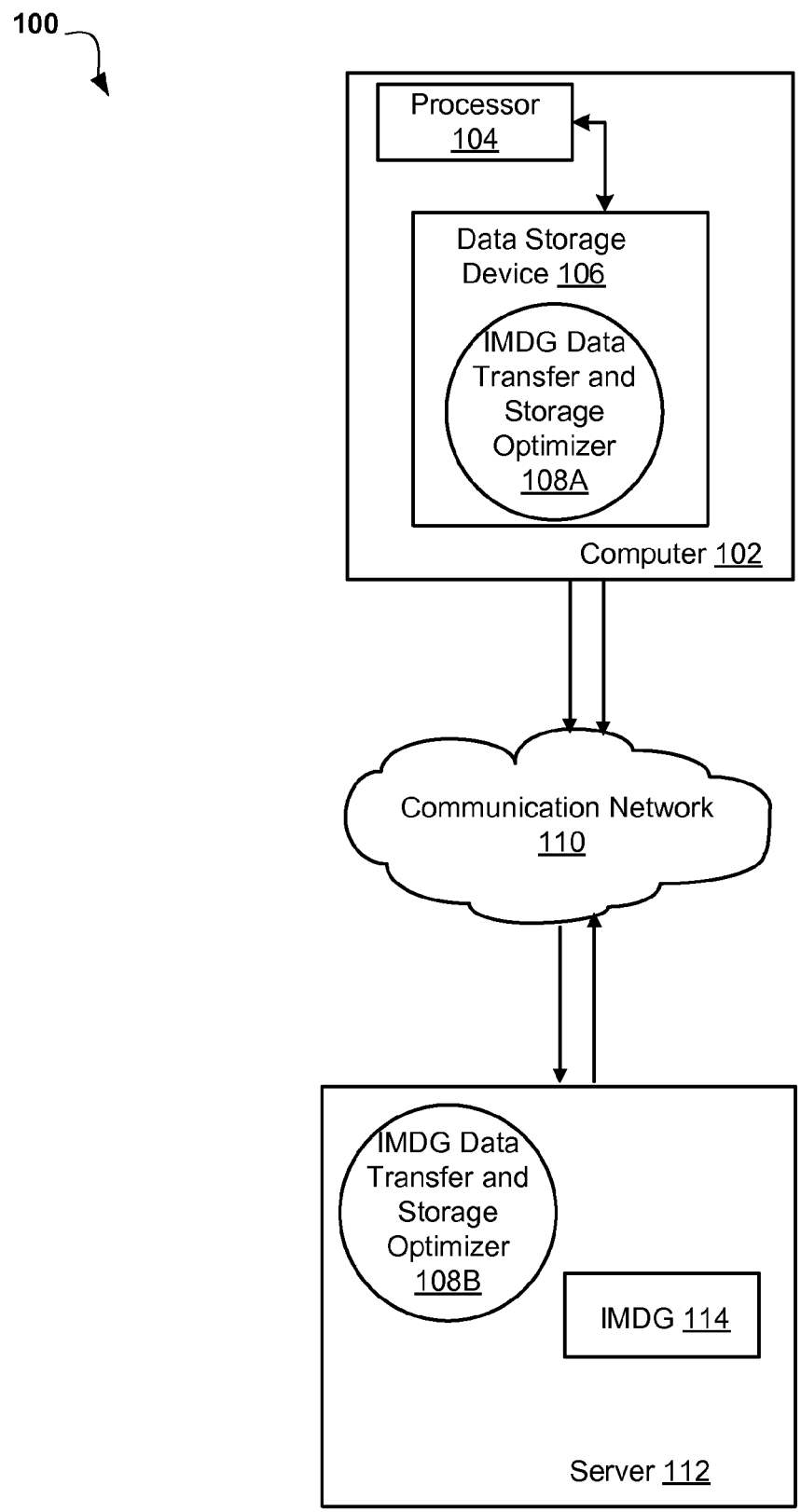
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly to the transfer and storage of data. The following described exemplary embodiments provide a system, method and program product to identify instances where fields on different object types reference the same value and to increase a subset of data returned to an in-memory data grid (IMDG) client with a full set of data values.

As previously described, in-memory data grid (IMDG) solutions typically provide security restrictions, such as key-based access as to who may access the data. While an IMDG solution may optimize data access, it can also be limiting as compared to the relational type access that relational databases offer. For example, dynamic queries and 'join' type operations may require special consideration to effectively implement in a grid. As such, this may often lead to the denormalization of data stored in an IMDG to ensure that when a particular data object is returned based on key-based access, it contains all of the necessary data for the client to complete processing. Therefore, while this may be optimal in terms of the number of requests a client must issue to an IMDG in order to get the data it requires, it may not be optimal in many other respects. In many IMDG solutions, the client has a cache of a subset of the data in the grid. Since this data is often denormalized, it may be likely that different types and instances of objects will actually reference the same data values in their fields. This may imply two things. First, unnecessary data may often be transferred over the network from the IMDG to the client. Second, unnecessary memory space may often be used in the client's local cache. As such, it may be advantageous, among other things to identify instances where fields on different object types reference the same value and to increase a subset of data returned to an IMDG client with a full set of data values.

According to at least one implementation, the present embodiment may identify instances where fields on different object types reference the same value. Additionally, the present embodiment may inflate a subset of data returned to an IMDG client with a full set of data values. As such, the amount of data returned from an IMDG to a client may be reduced. Furthermore, the amount of local memory consumed by the client-side cache may be reduced as well.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to identify instances where fields on different object types reference the same value and to increase a subset of data returned to an in-memory data grid (IMDG) client with a full set of data values. For example, an application may be storing a customer object and an account object in an IMDG. However, due to the nature of the application client's data access patterns, the data may be denormalized. Denormalization is the process of attempting to optimize the read performance of a database by adding redundant data or by grouping data. Therefore, the "customer object" may have a field named 'customerAge' and the "account object" may have a field called 'cAge'. Both fields may refer to the length of time the customer has had a relationship with the company. Furthermore, the "customer object" may reference an 'account object' via a field named 'acctId'. As such, according to one implementation of the present embodiment, both the customer and account data may be loaded into an IMDG. Then the method may launch a process to analyze the content of the data in the IMDG and determine occurrences of denormalized, related data. Therefore, the method may explore the object instances of the grid to first discover relationships between objects. With respect to the above example, the method may relate "customer objects" to "account objects" using the 'acctId' field on the "customer object". Next, the system may determine what fields to use based on customer-supplied metadata or by using existing technology.

Then, once the relationships in the IMDG were determined, the present embodiment may analyze the different fields and values on the related object instances. As such, the method may determine if there were cases where different fields on different object types always referred to the same value. With respect to the current example, the method may determine that the 'Customer.customerAge' field and the 'Account.cAge' field always referred to the same value. Therefore, the method may report the occurrence previously detected and may query the user to determine if the user may want to optimize for this similarity. If the user answers in the affirmative, the method may begin to take steps to optimize.

As such, the present embodiment may note the shared reference of the fields in the different object types. Additionally, according to at least one implementation, when serving client requests, the method may note the particular object type and object ID being returned to the client. With respect to the current example, the method may note the shared reference of Customer.customerAge and Account.cAge. Then, when a user requests an "account object" or a "customer object", the method may record the type of object that was served to the client as well as the ID of that object. Additionally, the method may also record metadata about the request such as the time it was made or the time at which it was sent back from the IMDG.

Then, for each request that comes to the IMDG, the method may analyze the request to determine if an optimization could be made. For example, an Account object with ID=1 may be requested by a client. However, the same client may subsequently make a request for a "customer object" which has an acctId=1. According to one implementation, the present embodiment may note this relational occurrence, and therefore the method may detect that the amount of data returned over the network to the client may be optimized by omitting the 'customerAge' field on the "customer object" being requested. According to at least one embodiment, the method may use some set of factors in determining whether or not an optimization was appropriate. For example, the method may consider whether or not the "account object" related to the "customer object" being requested had already been evicted from the client's local cache.

If the method determines that a data transfer optimization can be made, then the method may omit the appropriate data from the response. As such, on the client-side, when the response is received, the client portion of the method may detect that data has been omitted from the response. Therefore, upon detecting that data has been omitted, the method may search for the appropriate related object in the client's local cache. Then, upon locating the related data (which is of a different object type), the method may use the mapping information previously detected to fully inflate the object defined by the data returned in the initial response. According to at least one implementation, the inflation may only be done when the client requests access to the data in object form, and additionally, the user could elect to store data in the client's local cache in this sparse form, thereby lowering the memory space requirements of the client.

Referring now to FIG. 1, an exemplary networked computer environment 100 in accordance with one embodiment is depicted. The networked computer environment 100 may include a computer 102 with a processor 104 and a data storage device 106 that is enabled to run an IMDG data transfer and storage optimizer 108A. The networked computer environment 100 may also include a server 112 that is also enabled to run an IMDG data transfer and storage optimizer 108B and a communication network 110. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 4, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program, accessing a network, or accessing a server 112.

The client computer 102 may access server computer 112 via the communications network 110. For example, a user using an IMDG data transfer and storage optimizer 108A running on a client computer 102 may connect via a communication network 110 to optimally transfer data to a server 112; store data on a server 112 and access data stored on a server 112. The server 112 is capable of running an IMDG data transfer and storage optimizer 108B and an in-memory data grid (IMDG) 114.

Figure 2:
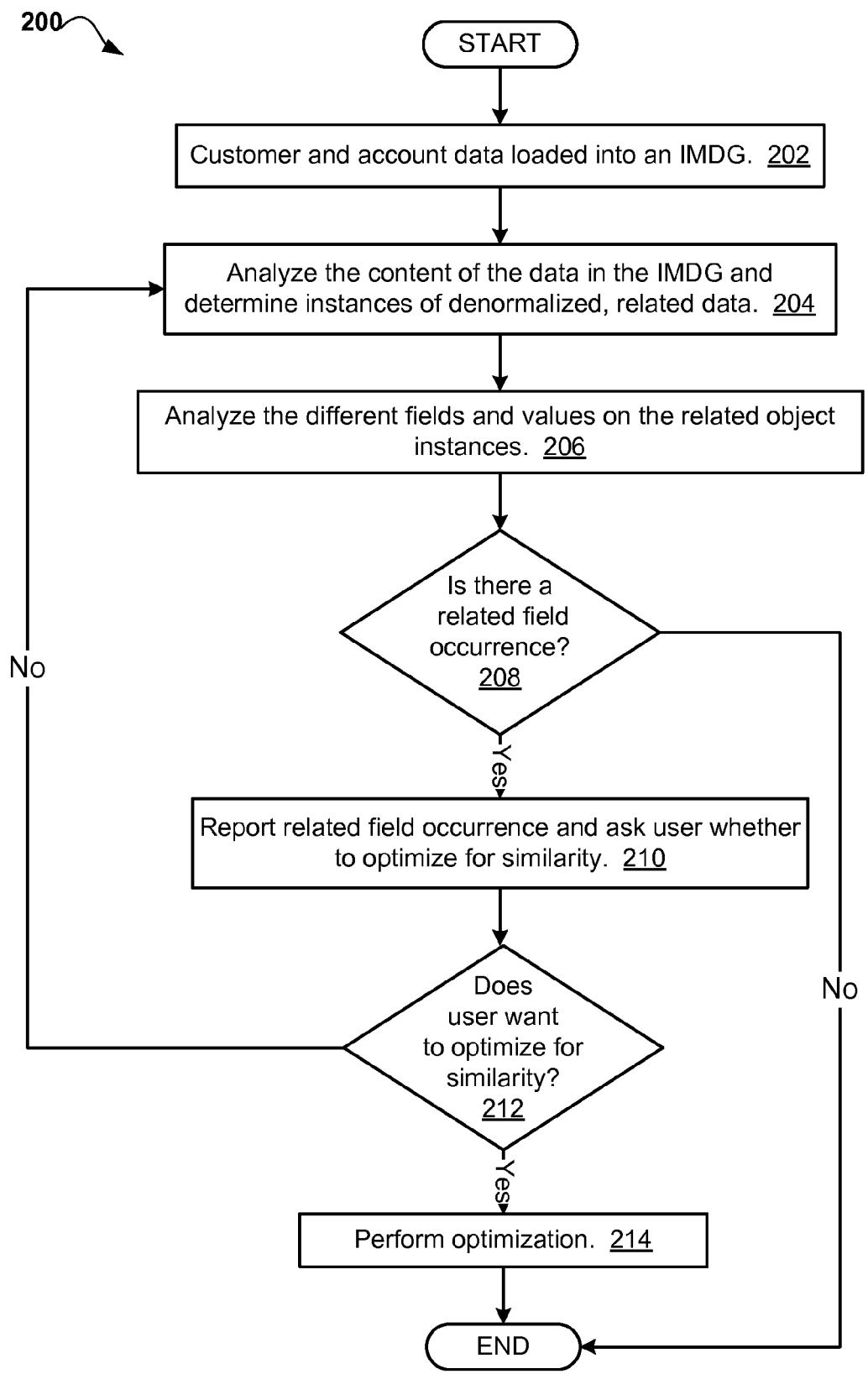
FIG. 2 is an operational flowchart illustrating the steps carried out by a program to optimize the transfer and storage of data when data is loaded into an IMDG according to at least one embodiment.

Referring now to FIG. 2, an operational flowchart 200 illustrating the steps carried out by a program to optimize the transfer and storage of data when data is loaded into an IMDG in accordance with one embodiment is depicted. As previously described, an IMDG data transfer and storage optimizer 108A, 108B may provide a means to identify instances in a data set where fields on different object types reference the same value. As such, the IMDG data transfer and storage optimizer 108A, 108B may reduce the amount of data returned from an IMDG to a client.

With respect to FIG. 2 at 202, the customer and account data may be loaded into an IMDG. As per the previously described example, an application may be storing a customer object and an account object in the IMDG. Therefore, the "customer object" may have a field named 'customerAge' and the "account object" may have a field called 'cAge'. Both fields may refer to the length of time the customer has had a relationship with the company. Furthermore, the "customer object" may reference an 'account object' via a field named 'acctId'. As such, according to one implementation of the present embodiment, both the customer and account data (i.e., the data set) may be loaded into an IMDG.

Then, at 204, the content of the data in the IMDG is analyzed and the instances of denormalized, related data are determined. Therefore, at least two data object instances associated with the data set may be identified based on a determined relationship between the at least two data object instances. As such, the method may launch a process to analyze the content of the data in the IMDG and determine occurrences of denormalized, related data. Therefore, the method may explore the object instances of the grid to first discover relationships between objects. With respect to the above example, the method may relate "customer objects" to "account objects" using the 'acctId' field on the "customer object". Next, the system may determine what fields to use based on customer-supplied metadata or by using existing technology. According to one implementation, the present embodiment may analyze the objects in the IMDG at a certain point in time. However, according to an alternate implementation, the analyzation may be a reoccurring event where the present embodiment may analyze the objects in the IMDG periodically due to the dynamic nature of the data stored in the IMDG.

Next, at 206, the different fields and values on the related object instances are analyzed. Therefore, a field relation analysis on the identified at least two data object instances may be performed. As such, all related instances may be found and field relation analysis may be performed by searching for field equality (i.e., denormalization) across object types where equality holds across all instances. Therefore, a search may be performed to determine a field equality across all instances of the at least two related data objects. Furthermore, a relationship may be identified between the at least two data objects based on the at least two data objects sharing a reference field value. As such, the method may determine if there were cases where different fields on different object types always referred to the same value (i.e., repeated data). With respect to the current example, the method may determine that the 'Customer.customerAge' field and the 'Account.cAge' field always referred to the same value.

Then at 208, it is determined as to whether there is a related field occurrence. If at 208, it is determined that there is not a related field occurrence, then the process may end. However, if at 208 it is determined that there is a related field occurrence, then at 210 the related field occurrence is reported to the user and the user is asked whether to optimize for similarity. For example, the method may report the occurrence previously detected and may query the user to determine if the user may want to optimize for this similarity.

Next, at 212, it is determined whether the user wants to optimize for similarity. If at 212, it is determined that the user does not want to optimize for similarity, then, the method may continue back to step 204 to analyze the content of the data in the IMDG and determine instances of denormalized, related data as previously described. However, if at 212, it is determined that the user does want to optimize for similarity, then, at 214 the method begins to take steps to optimize. Therefore the system may begin to act on object requests.

As such, the present embodiment may note the shared reference of the fields in the different object types. Therefore, according to at least one implementation, when serving client requests, the method may record the field relation analysis. As such, the method may note the particular object type and object ID being returned to the client. With respect to the current example, the method may note the shared reference of Customer.customerAge and Account.cAge. Then, when a user requests an "account object" or a "customer object", the method may record the type of object that was served to the client as well as the ID of that object. Additionally, the method may also record metadata about the request such as the time it was made or the time at which it was sent back from the IMDG.

Figure 3:
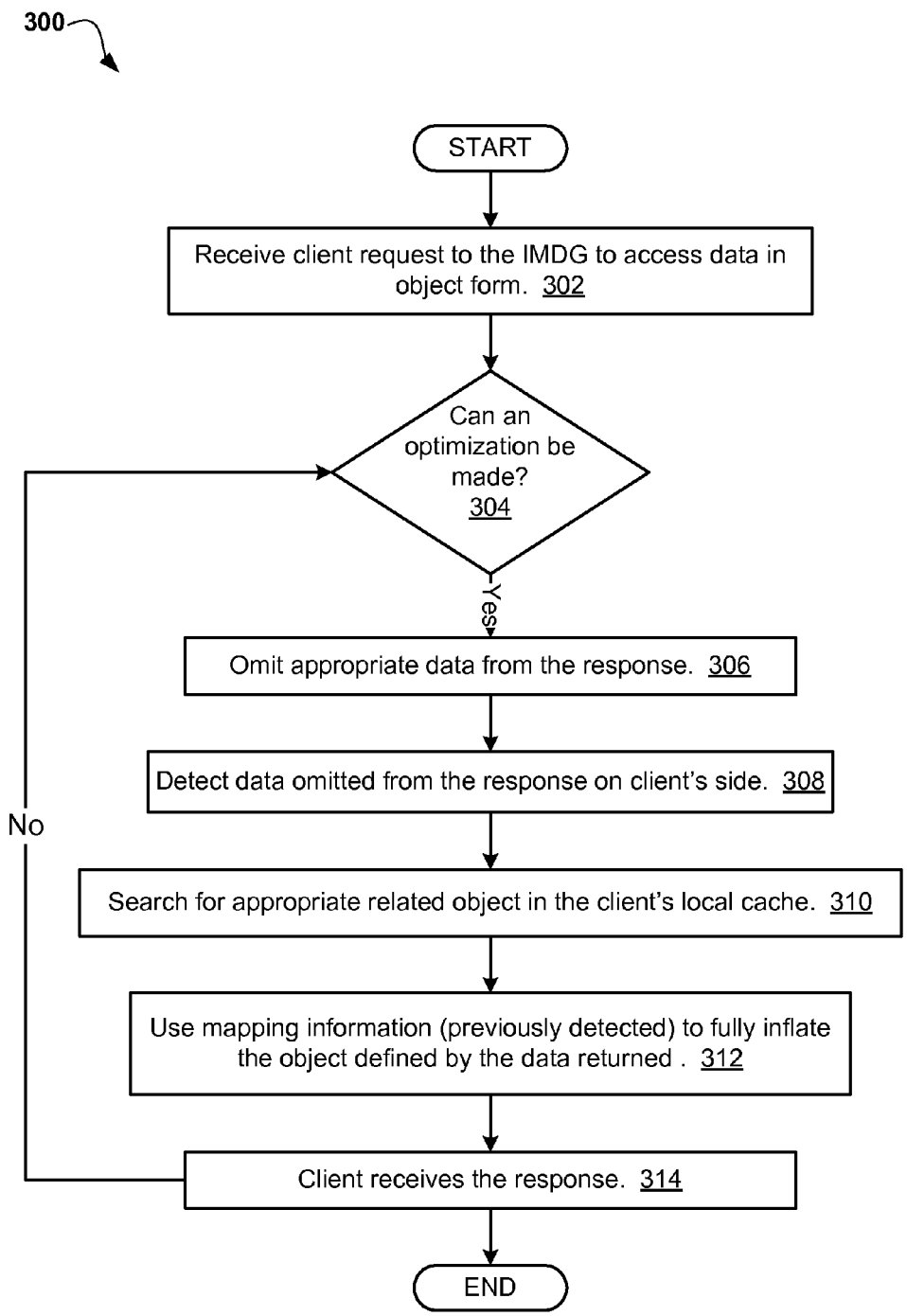
FIG. 3 is an operational flowchart illustrating the steps carried out by a program to optimize the transfer and storage of data when a request is received by the IMDG according to one embodiment.

Referring now to FIG. 3, an operational flowchart 300 illustrating the steps carried out by a program to optimize the transfer and storage of data when a request is received by the IMDG in accordance to one embodiment is depicted. As previously described, an IMDG data transfer and storage optimizer 108A, 108B may inflate a subset of data returned to an IMDG client with a full set of data values. As such, the IMDG data transfer and storage optimizer 108A, 108B may reduce the amount of local memory consumed by the client side cache.

With respect to FIG. 3 at 302, the client request to the IMDG to access data in object form is received (i.e., a request for a data object associated with a data set). Then at 304, for each request that comes to the IMDG, the method may analyze the request to determine if an optimization could be performed on the data object. Therefore, upon request for an object, the method may first determine if the object contains an occurrence of field equality as previously discovered with respect to the field relation analysis performed in step 206 (FIG. 2). If field equality exists, then the method may determine if a related object instance already exists on the client local cache side. For example, an Account object with ID=1 may be requested by a client. However, the same client may subsequently make a request for a "customer object" which has an acctId=1. According to one implementation, the present embodiment may note this relational occurrence, and therefore the method may detect that the amount of data returned over the network to the client may be optimized by omitting the 'customerAge' field on the "customer object" being requested. According to at least one embodiment, the method may use some set of factors in determining whether or not an optimization was appropriate. For example, the method may consider whether or not the "account object" related to the "customer object" being requested had already been evicted from the client's local cache.

If a related object does not exist, then at 304, the method may determine that an optimization cannot be performed. As such, the method may continue to step 314 in which the client receives the response associated with the request. However, if a related object exists, then at 304, the method may determine that a data transfer optimization can be performed. Therefore, the method may continue to step 306 and omit the appropriate data from the response. Therefore, the method may omit a field value associated with the data object (i.e., for the object being served over the network).

Next, at 308, on the client-side, when the response is received, the client portion of the method may detect that data (i.e., the field value) has been omitted from the response. Therefore at 310, upon detecting that data has been omitted, the method may search for the appropriate related object in the client's local cache (i.e., detect, in the local cache, the data object associated with the omitted field value). Then at 312, upon locating the related data (which is of a different object type), the method may use the mapping information previously detected (i.e., perform mapping of the detected data object in the local cache with the omitted field value) to fully inflate the object defined by the data returned in the initial response. As such, when the object arrives on the client's system at 314, the data may be returned with the inflated field value. Therefore, the method may inflate the omitted field values into the data set associated with the data object request by using the field value from the related object instance already stored in the cache. As such, the present embodiment may insert the mapped field value into the data object request. According to at least one implementation, the method may also do inflation only upon request thereby saving memory space in the client-side cache. For example, the inflation may only be done when the client requests access to the data in object form, and additionally, the user could elect to store data in the client's local cache in this sparse form, thereby lowering the memory space requirements of the client.

Figure 4:
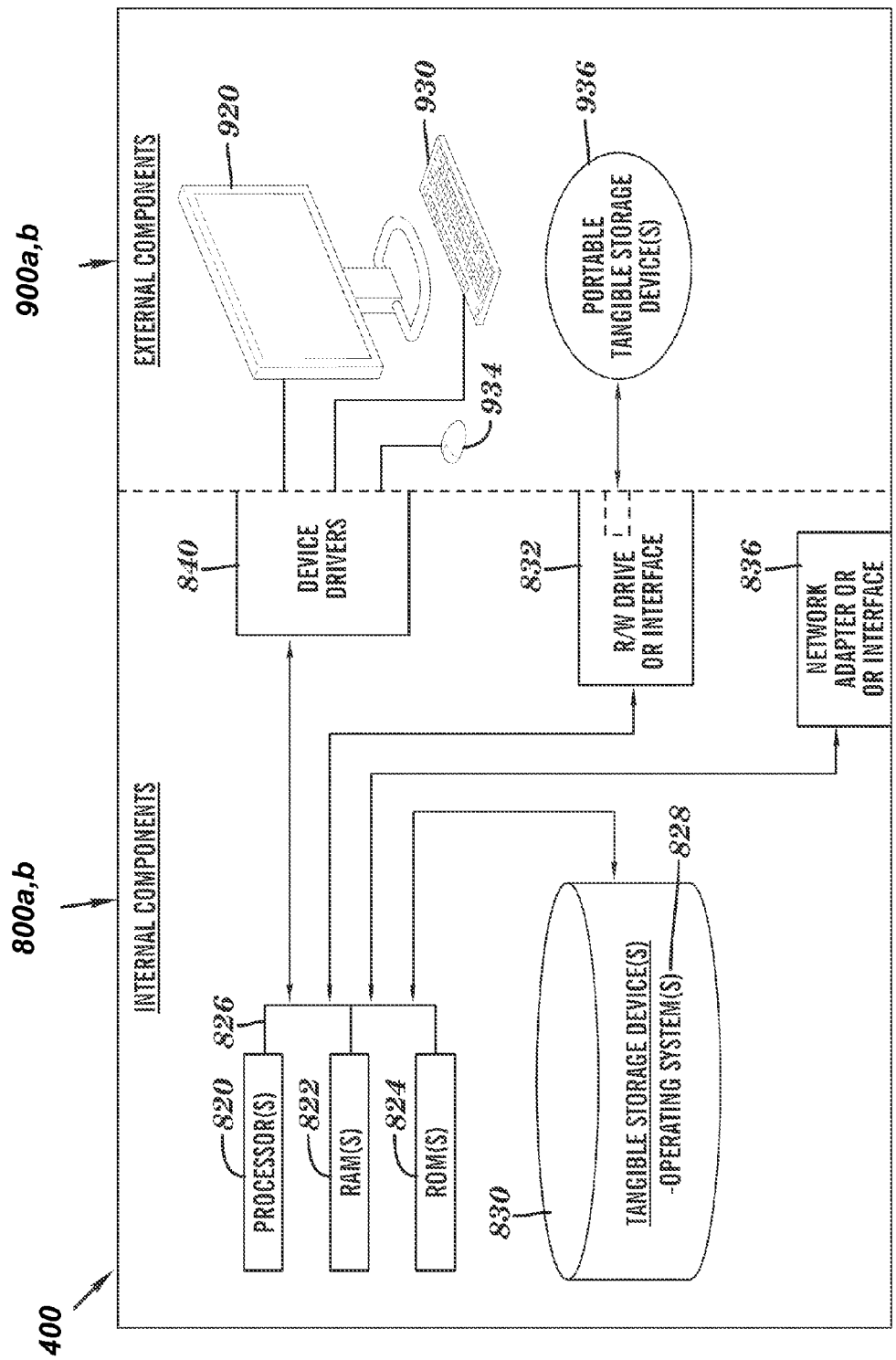
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800 a, b and external components 900 a, b illustrated in FIG. 4. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and software program 108 (FIG. 1) in client computer 102 are stored on one or more of the respective computer-readable tangible storage medium 830 for execution by one or more of the respective processors 820 via one or more of the respective RAMs 822 (which typically include cache memory). In the embodiment illustrated in FIG. 4, each of the computer-readable tangible storage medium 830 is a magnetic disk storage device of an internal hard drive. Alternatively, each of the computer-readable tangible storage medium 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage medium 936 such as a CD-ROM, DVD, memory stick, magnetic tape, magnetic disk, optical disk or semiconductor storage device. A software program, such as IMDG data transfer and storage optimizer program 108A and 108B can be stored on one or more of the respective portable computer-readable tangible storage medium 936, read via the respective R/W drive or interface 832 and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. The IMDG data transfer and storage optimizer program 108A in client computer 102 and IMDG data transfer and storage optimizer program 108B in network server 112 can be downloaded to client computer 102 from an external computer via a network (for example, the Internet, a local area network or other, wide area network) and respective network adapters or interfaces 836. From the network adapters or interfaces 836, the IMDG program 108A in client computer 102 and the IMDG data transfer and storage optimizer program 108B in network server computer 112 are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 *a, b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for transferring and storing a data set associated with an in-memory data grid (IMDG), the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   in response to the data set being loaded into the IMDG associated with a first computer, identifying at least two data object instances associated with the loaded data set based on a determined relationship between the at least two data object instances, wherein the identifying occurs periodically;
   performing a field relation analysis on the identified at least two data object instances, wherein performing a field relation analysis comprises determining whether the identified at least two data object instances share a reference field value;
   prompting a user using a second computer to determine whether to optimize the identified at least two data instances sharing a reference field value;
   in response to the user determining to optimize the identified at least two data instances sharing a reference field value, recording the field relation analysis;
   receiving a request for a data object associated with the data set;
   determining if an optimization can be performed on the data object based on the recorded field relation analysis;
   omitting a field value associated with the data object based on the determined optimization;
   inflating the omitted field value into the data set associated with the data object request;
   returning the data set with the inflated field value; and
   recording a plurality of metadata associated with the received request, wherein the recorded metadata comprises a time the request was received, a time the data set was returned, an object type associated with the requested data object, and an ID associated with the requested data object.

2. The computer system of claim 1, wherein the inflating the omitted field value comprises:
   detecting, in a local cache, the data object associated with the omitted field value;
   mapping the detected data object in the local cache with the omitted field value; and
   inserting the mapped field value into the data object request.

3. The computer system of claim 1, wherein the performing the field relation analysis comprises searching for a field equality across all instances of the at least two related data objects.

4. The computer system of claim 1, wherein the determining if an optimization can be performed comprises determining if a related data object instance exists in a local cache.

5. A computer program product for transferring and storing a data set associated with an in-memory data grid (IMDG), the computer program product comprising:
   one or more computer-readable tangible storage medium and program instructions stored on at least one of the one or more tangible storage medium, the program instructions executable by a processor, the program instructions comprising:
   in response to the data set being loaded into the IMDG associated with a first computer, program instructions to identify at least two data object instances associated with the loaded data set based on a determined relationship between the at least two data object instances, wherein the identifying occurs periodically;
   program instructions to performing a field relation analysis on the identified at least two data object instances, wherein performing a field relation analysis comprises determining whether the identified at least two data object instances share a reference field value;
   program instructions to prompt a user using a second computer to determine whether to optimize the identified at least two data instances sharing a reference field value;
   in response to the user determining to optimize the identified at least two data instances sharing a reference field value, program instructions to record the field relation analysis;
   program instructions to receive a request for a data object associated with the data set;
   program instructions to determine if an optimization can be performed on the data object based on the recorded field relation analysis;
   program instructions to omit a field value associated with the data object based on the determined optimization;
   program instructions to inflate the omitted field value into the data set associated with the data object request;
   program instructions to return the data set with the inflated field value; and
   program instructions to record a plurality of metadata associated with the received request, wherein the recorded metadata comprises a time the request was received, a time the data set was returned, an object type associated with the requested data object, and an ID associated with the requested data object.

6. The computer program product of claim 5, wherein the inflating the omitted field value comprises:
   program instructions to detect, in a local cache, the data object associated with the omitted field value;
   program instructions to map the detected data object in the local cache with the omitted field value; and
   program instructions to insert the mapped field value into the data object request.

* * * * *